United States Patent [19]
Rotier

[11] 4,038,870
[45] Aug. 2, 1977

[54] AIR MOVEMENT MEASURING APPARATUS

[75] Inventor: Donald Jack Rotier, St. Paul, Minn.

[73] Assignee: Honeywell Inc., Minneapolis, Minn.

[21] Appl. No.: 675,036

[22] Filed: Apr. 8, 1976

[51] Int. Cl.² .................... G01C 21/12; G01P 5/00
[52] U.S. Cl. ................................. 73/181; 73/189
[58] Field of Search ............... 73/170 A, 181, 188, 73/189, 194 A

[56] References Cited

U.S. PATENT DOCUMENTS

| 1,495,852 | 5/1924 | Kunze | 73/189 |
|---|---|---|---|
| 3,222,926 | 12/1965 | Carver | 73/181 X |
| 3,343,413 | 9/1967 | South et al. | 73/189 X |
| 3,379,060 | 4/1968 | Pear | 73/194 X |
| 3,548,653 | 12/1970 | Corey | 73/189 |
| 3,782,193 | 1/1974 | Meyer et al. | 73/181 X |
| 3,949,605 | 4/1976 | Stallworth et al. | 73/189 X |

*Primary Examiner*—Herbert Goldstein
*Attorney, Agent, or Firm*—Henry L. Hanson

[57] ABSTRACT

An ultrasonic air movement vector and magnitude sensing apparatus using a three element ultrasonic probe and temperature sensor in combination with an electronic computational circuit to produce air movement signals indicative of magnitude and direction in at least three cardinal axes.

1 Claim, 8 Drawing Figures

AIR MOVEMENT MEASURING APPARATUS

BACKGROUND OF THE INVENTION

The present invention relates to an apparatus for measuring the relative speed and direction of air moving past an ultrasonic sensing probe. In particular, the present invention comprises a wind vector and velocity measuring apparatus utilizing variations in the propagation time of ultrasonic waves moving from a transmitting transducer means to a plurality of spatially positioned receiving transducer elements.

An aircraft in flight is normally moving so that air will be flowing past the aircraft or moving relative to the aircraft. In order to exercise optimum control over the aircraft itself, or over operations associated with the aircraft when in flight, it is necessary to know the manner in which air is moving past the aircraft. By measuring the air movement, it is then possible to obtain a measure of the forces that are being exerted on the aircraft.

The air movement relative to the aircraft is most conveniently considered in three dimensions; related to the aircraft itself, the directions being along a primary or forward and reverse axis of the aircraft, a vertical axis extending up and down at a right angle to the primary axis of the aircraft, and a horizontal axis extending left and right at a right angle to the primary axis of the aircraft.

Air movement sensing probes have been utilized with aircraft in the past but such probes have not produced the degree of accuracy necessary for modern flight sensing and control purposes.

Ultrasonic measuring devices have been utilized heretofor measuring liquid and gaseous flows. In addition, ultrasonic anemometers have been built but such apparatus heretofore known has not been suitable or practical for use in aircraft installations where factors of size, weight and accuracy must be optimized.

Representative ultrasonic anemometer type apparatus heretofore known will be found in the following identified references:

"A Continuous-Wave Sonic Anemometer-Thermometer," J. C. Kaimal and J. A. Businger (manuscript received Mar. 5, 1962) (pp. 156-167)

"Deriving Power Spectra from a Three-Component Sonic Anemometer," J. C. Kaimal, J. C. Wyngaard and D. A. Haugen, October, 1968. (pp. 827-837)

"Improvements and Refinements on a Pulse Type Sonic Anemometer," Arthur Bisberg, Arthur Papas, and David J. Beaubien. (pp. 1-50)

"Wind Speeds as Measured by Cup and Sonic Anemometers and Influenced by Tower Structure," Yutaka Izumi and Morton L. Barad, December 1970. (pp. 851-856)

SUMMARY OF THE INVENTION

The present invention is a new and improved air movement vector and magnitude sensing apparatus utilizing an ultrasonic wave transmitting transducer which is arranged to radiate ultasonic wave energy along three separate paths to ultrasonic receiver transducers, the three paths being provided to serve as a convenient means for readily determining the variations in the relative propagation times of an ultrasonic wave from the transmitter transducer along the three paths which will be representative of the relative vectors and speed of air flow past the sensing apparatus. The signals from the receiver transducers are coupled through appropriate amplifiers and time differential sensing apparatus into computer circuitry from which it is possible to calculate the relative air movement in terms of its vectors and speed. The sensing probe is physically arranged and formed so as to be operative over a wide range of air speeds and to minimize the generation of air flow disturbances in the measuring paths of the probe which would otherwise disrupt the measuring functions of the probe. Further, the probe is connected as a part of a new computational system which has been designed to match the unique functional characteristics of the probe to an optimized set of timing signals derived from the probe.

DESCRIPTION OF THE INVENTION

Figure 1:
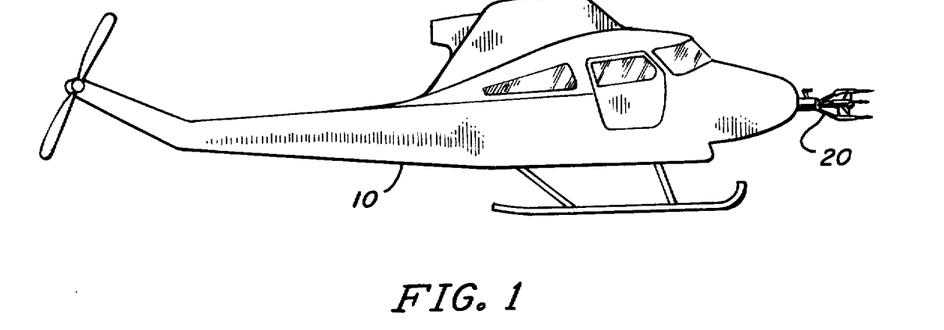
FIG. 1 is a representation of an aircraft carrying an air sensing probe of the present invention.

Referring first to FIG. 1, there is here illustrated an aircraft 10 in the form of a helicopter. Mounted on the forward end of the aircraft is an air sensing probe 20. The probe 20, as contemplated herein, is particularly adapted for use on helicopter type aircraft. The reason for this is that helicopters are capable of being operated in a wide range of airspeed and directions. For example, helicopters may be operated under conditions involving wide variations in altitude, movement to the left or right, as well as movement along the longitudinal axis of the craft. In the more normal type of operation, helicopter type aircraft will be operated so that there is some component of forward movement. By placing the probe 20 on the forward end of the aircraft 10, as illustrated, the probe will be substantially free of any life propellor "down-wash" when the craft is moving forward at 10 knots or more.

Figure 2:
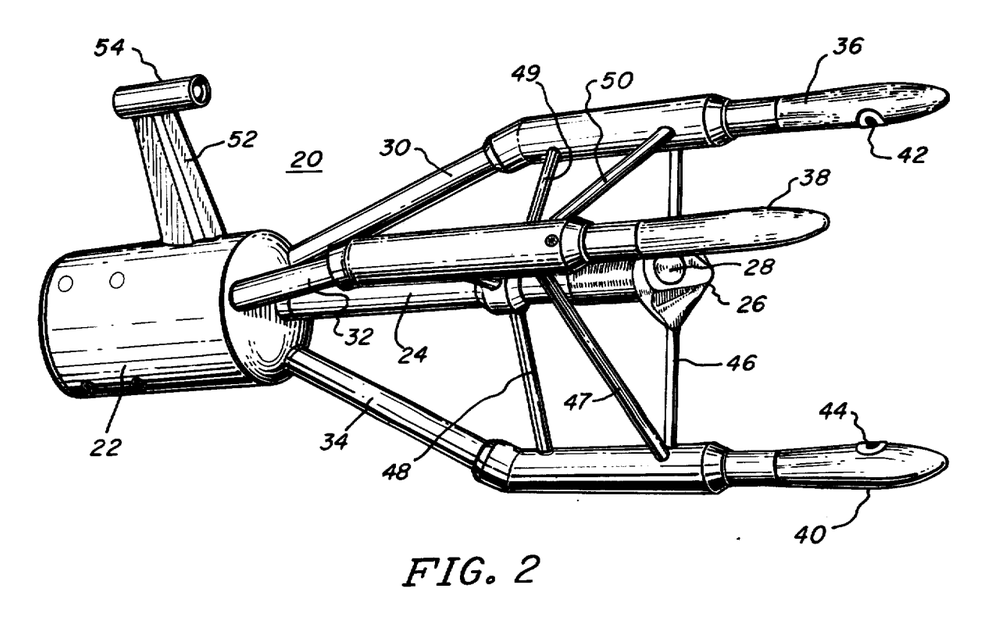
FIG. 2 illustrates a preferred form of construction of the sensing probe.

The probe 20 is shown in greater detail in FIG. 2 and will be seen there to comprise a base supporting element 22 which is adapted to be fastened to an aircraft in any suitable manner, but preferably along the longitudinal axis of the craft so that the elements of the probe are projected in a forward direction or along the primary axis of the craft. Extending from the support member 22 is a transmitter support 24 which carries a transmitting transducer head 26 on the end thereof. The forward surface of the transducer head 26 is tapered toward the support at an angle of approximately 45°. Mounted in the surface of this transducer head are three transmitting transducers, only one of which is illustrated at 28. The surface of the transducer 28 is essentially flush with the surface of the transducer head 26 and, when driven, is adapted to cause an ultrasonic wave to be projected from the surface of the transducer along a path that is essentially perpendicular to the surface.

Also carried on the support 22 are three receiver supports, 30, 32 and 34, which project outwardly and forwardly from the support 22 and carry at their outer ends three receiver transducer housings 36, 38 and 40 respectively. These housings are streamlined, particularly in the forward facing direction, so as to minimize the extent to which air flow passing over the surfaces will be disturbed by the housings and thereby interrupt the effectiveness of the overall probe. A receiver transducer is mounted in the face of each of the housings 36, 38 and 40. The surface portion of receiver transducers 42 and 44 are shown in the surfaces of the housings 36 and 40 respectively. The receiver transducers are mounted on the inner surfaces of the housings so as to be in a direct communication path with an associated transmitting transducer. In one particular embodiment of the invention, the receiving transducer was positioned approximately two inches forward of its corresponding transmitter transducer and approximately two inches laterally or to the side from the principal axis of the probe 20.

The receiver transducer supports 30, 32 and 34, are held firmly in position with respect to each other and with respect to the transmitter support 24 by way of a series of struts 46, 47, 48, 49, and 50.

Also mounted on the support 22 is a temperature sensing support 52 which carries on its outer end a hollow cylindrical housing 54 in which there is positioned a suitable temperature sensing element such as a platinum wire, not shown. Air is adapted to flow through the cylinder 54 so that the element therein will be able to sense the ambient temperature of the air acting on the probe.

The probe 20 has been designed so that ultrasonic wave energy from the transmitter head 26 moves in a single direction toward the three receivers rather than in both directions along a common path as has been done in other types of ultrasonic flow measuring devices. The present arrangement permits the design of optimum types of transmitting and receiver transducers without requiring that those transducers function in a dual mode. Thus, the receiver transducer may be smaller in size and housed in a protective housing which is less likely to induce air disturbances over the intended operating ranges of operation. Further, the time difference measurements discussed below are best handled with respect to a single fixed-direction path in the probe as will occur when the probe of the present invention is used.

Figures 3, 4, 5:
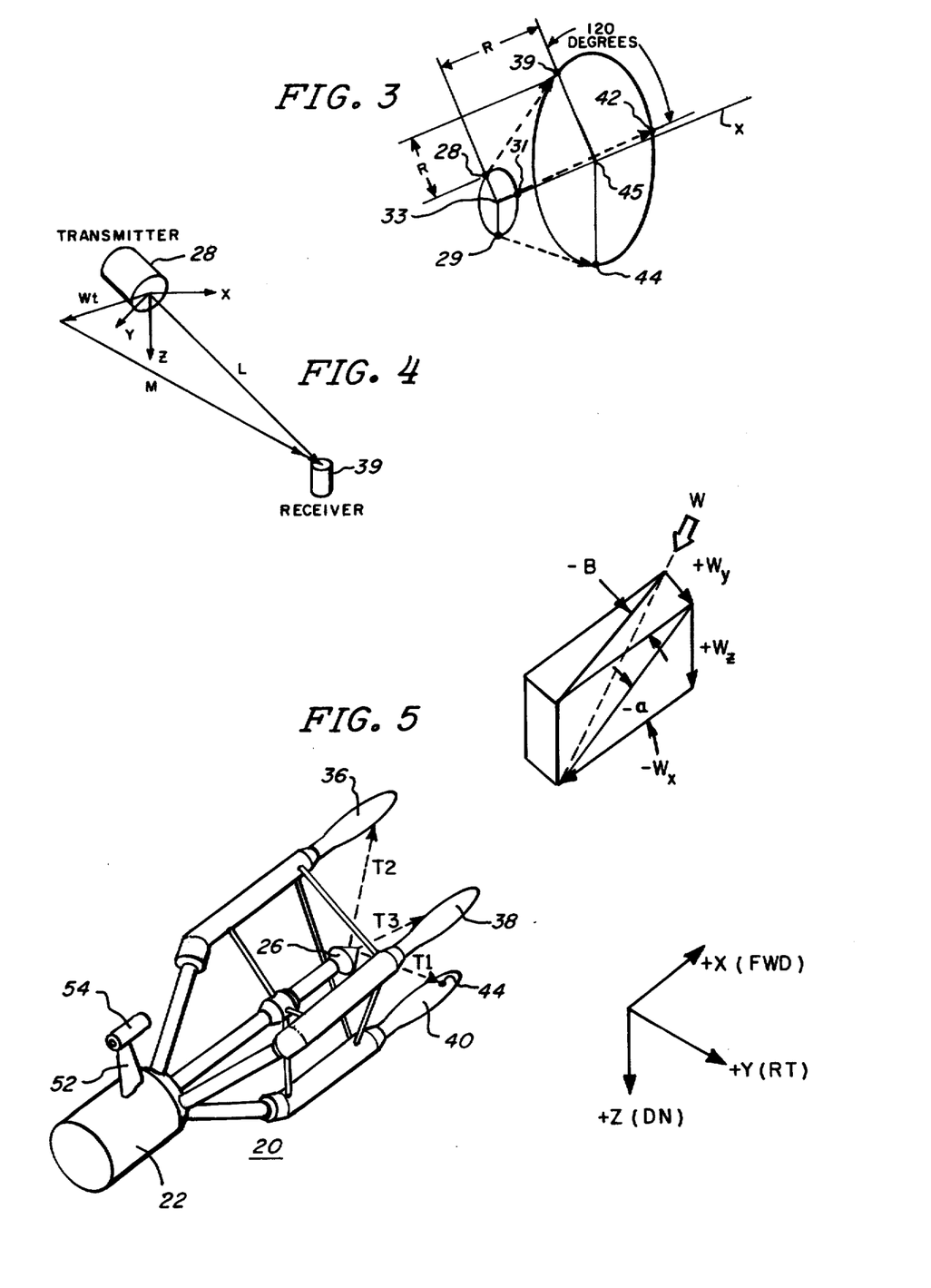
FIG. 3 illustrates the basic geometry associated with the positioning of the transmitting and receiving transducers of the probe.
FIG. 4 illustrates the basic geometry associated with a representative flow of air with respect to a single transmitter and receiving transducer of the invention.
FIG. 5 illustrates the basic probe geometry relative to three basic vectors associated with a representative air flow past the probe of the invention.

The preferred geometrical configuration for the transmitters and receivers in the probe 20 are illustrated in FIG. 3. In FIG. 3 the common or principal axis of the probe is identified by the line X. Three transmitting transducers 28, 29 and 31 are represented by the dots which appear upon a common plane which is at right angles to the axis X and which plane intersects the axis at point 33. In the preferred embodiment, the transmitting transducers 28, 29 and 31, are displaced from the primary axis X by a common or equal distance.

Three receiver transducers 39, 42 and 44, are also equally spaced about the principal axis X and in a common plane which is at right angles to the axis X and intersects the axis at a point 45. In the common plane of the transmitting transducers and receiver transducers, the respective transducers are displaced 120° with respect to each other. As indicated above, the longitudinal displacement of the transmitter transducers and the receiver transducers is approximately 2 inches, which in FIG. 3 is represented by the displacement of point 33 from that of point 45. Similarly, the respective receiving transducers are positioned radially approximately 2 inches from the central axis and the transmitting transducers.

FIG. 4 illustrates the basic geometry associated with a single transmitter — receiver transducer combination. Here there is shown the transmitter transducer 28 and its cooperating receiver transducer 39. The principal axis X is illustrated as well as the secondary axes Y and Z. The vector representing the direct transmitter to receiver transmission is represented by the line L. An air movement or wind vector is illustrated by the line $W_t$. The resultant wave transit vector is represented by the line M.

When ultrasonic wave energy is transmitted by the transmitter 28, that energy is projected toward the receiver 39 and, in the absence of any air movement, the wave energy transmitted will be received at the receiver 39 in a first time interval. If there is an air movement lateral to the line L present, such as represented by the vector line $W_t$, the ultrasonic wave energy from the transmitting transducer will have to traverse what constitutes a longer path in its journey from the transmitter transducer 28 to the receiver transducer 39 and this will result in the time interval for such a transmission being longer than that when there is no air movement. The existence of this time interval differential between an air movement and no air movement provides the basic signal necessary for determining the air movement vector and velocity or speed past the probe.

FIG. 5 illustrates more of the geometry of the probe of the system. In this figure, the probe 20 is represented with its centrally positioned transmitting transducer head 26 and the spatially positioned receiver transducer housings 36, 38 and 40, the latter having shown on the surface thereof the receiver transducer 44. The preferred positioning of the probe relative to the axis of the aircraft is illustrated with the principal axis X being defined as being forward, the axis horizontal and to the right by the axis Y, and the down axis by the axis Z. Air or wind moving relative to the probe is also illustrated in the figure by the actual wind W shown divided into its three basic components $W_x$, $W_y$, and $W_z$. In most instances, particularly when the probe is to be used in a helicopter type of aircraft, it is desirable to measure all three of the air movement vectors represented in FIG. 5.

The mathematical equations associated with the basic functioning of the probe 20 are as follows:

$$W_x = \frac{-R}{3}\left(t\frac{1}{1} + t\frac{1}{2} + t\frac{1}{3}\right) + \frac{(C^2 - W^2)}{6R} 9(5t_1 + t_2 + t_3)$$

$$W_y = \frac{R\sqrt{3}}{3}\left(t\frac{1}{2} - t\frac{1}{3}\right) - \frac{(C^2 - W^2)\sqrt{3}}{6R}(t_2 - t_3)$$

$$W_z = \frac{-R}{3}\left(t\frac{2}{1} - t\frac{1}{2} - t\frac{1}{3}\right) + \frac{(C^2 - W^2)}{6R}(2t_1 - t_2 - t_3)$$

$$W^2 = W_x^2 + W_y^2 + W_z^2$$

$$C^2 = C_0^2\left(\frac{T + 273}{298}\right)$$

$C_O = 346.192$ METERS PER SECOND

The foregoing equations, while theoretically usable for purposes of calculating the desired vectors and air or wind speeds, are difficult to implement and the apparatus needed is more cumbersome and expensive than is necessary without producing correspondingly accurate results. For this reason, it was deemed necessary to simplify the equations by a series of iterative steps and approximations into a form which is as follows:

$$W_x = \frac{S_1W^2 + [S_2 + S_3W^2 + S_4(T-25)]}{[t_1 + t_2 + t_3 - 3t_0][S_5(T-25) + S_6(T-25)^2]}$$
$$W_y = Q_1[Q_2 + Q_3W_x + Q_4(T-25)][t_2 - t_3]$$
$$W_z = Q_5[Q_2 + Q_3W_x + Q_4(T-25)][2t_1 - t_2 - t_3]$$
$$W^2 = W_x^2 + W_y^2 + W_z^2$$
$$C = P_1[P_2W_x + (P_3C^2 + P_4W^2)(t_4 - t_1)]$$
$$(T-25) = R_1C^2 + R_2$$
$P_1 \to P_4$, $Q_1 \to Q_5$, $R_1 \to R_2$ AND $S_1 \to S_6$ ARE CONSTANTS
$t_1$, $t_2$, AND $t_3$ = TRANSIT TIMES
$t_0$ = REFERENCE TIME AT $W + 0$ AND $T + 25°$ C
$(T-25)$ = TEMPERATURE $- 25°$ C The selection of the foregoing equations with the objective of optimizing the hardware implementation makes it possible to design a new computational system which will perform the calculations as necessary. The actual implementation may be carried out using digital or analog type hardware although analog hardware has been used in a preferred embodiment.

The use of the simplified equations enables the apparatus to be configured in a form which is less expensive, involves less hardware, while achieving a degree of accuracy far greater than has been possible heretofore. This may be seen by noting that in the first set of equations, the equations each contain a term requiring the taking of the differences of the reciprocals of certain measured times. These terms are so small that the possibility of error increases substantially. The second set of simplified equations has eliminated this type of term.

Figure 6:
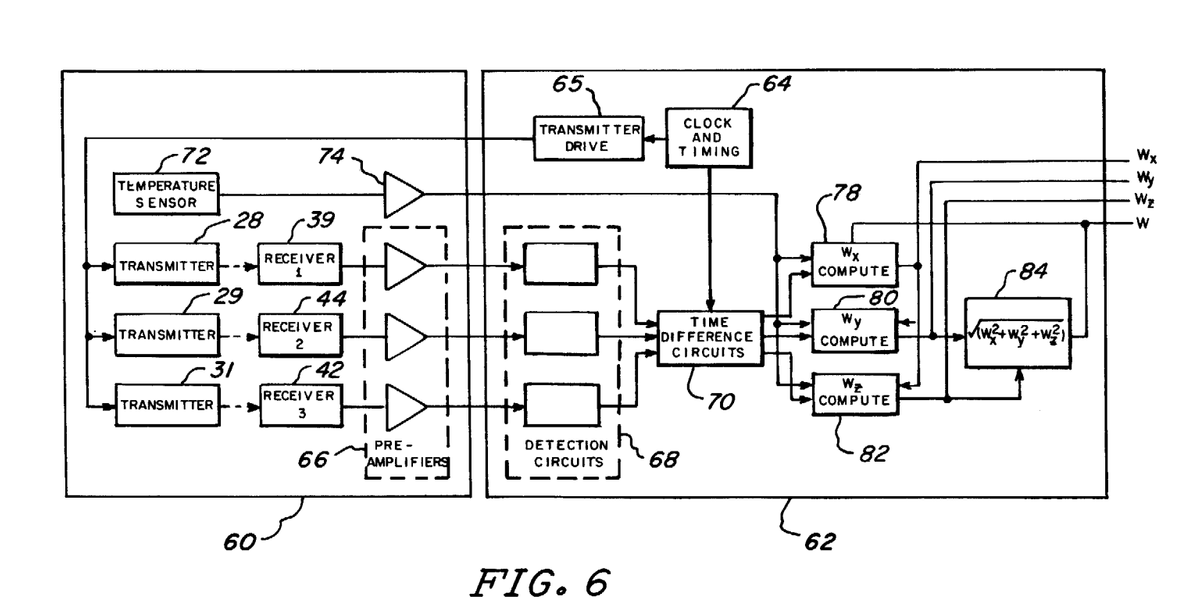
FIG. 6 illustrates diagrammatically the circuitry associated with the overall sensing system for both driving the transducers, receiving the control signals and making the computations therefrom as necessary to determine air flow speed and vectors, and FIG. 7 A and B is a more detailed diagrammatic representation of signal conditioning and computational apparatus of the system.

The basic circuitry for implementing the electronics of the system is illustrated diagramatically in FIG. 6 where the electronics for the sensor unit are represented within the general block 60 and the electronics of the detection and computation circuitry will be found within the block 62. The synchronizing of the overall system is derived from the clock signals originating from a timing clock 64. Signals from the clock 64 pass through a transmitter drive circuit 65 to feed a driving signal to the ultrasonic wave transmitters deemed here to include the transducers 28, 29 and 31. Signals from these transmitters are passed across the paths to the respective receivers 39, 44 and 42. The received signals pass through an appropriate preamplifier circuit 66 and then to detection circuitry 68, the latter of which shapes the pulses received from the preamplifiers into a form such that the differential in time of propagation of the signals in the three paths may be determined in the time difference circuits 70. These time difference circuits also receive a timing signal from the clock source 64. The temperature sensor of the apparatus, identified in block 60 as unit 72, provides, by way of a resistance signal, a temperature indication. This signal is transferred by way of a temperature amplifier 74, which feeds an output signal over to the computational circuit in the block 62. Separate computational circuits are provided for each of the major wind vectors which are to be measured. These circuits are basically similar and are internally organized in order to implement the calculations of the simplified equations above. Computation circuit 78 is used to compute the $W_x$ air movement vector, the computation circuit 80 is used to compute the $W_y$ air movement vector, and the computation circuit 82 is provided to compute the $W_z$ air movement vector. The amplitude of the full relative wind from which the vectors are derived is computed in the computation circuit 84. The outputs of these four computational circuits are then available for use with appropriate indication and/or control circuitry associated with the aircraft carrying the equipment.

Figure 7A:
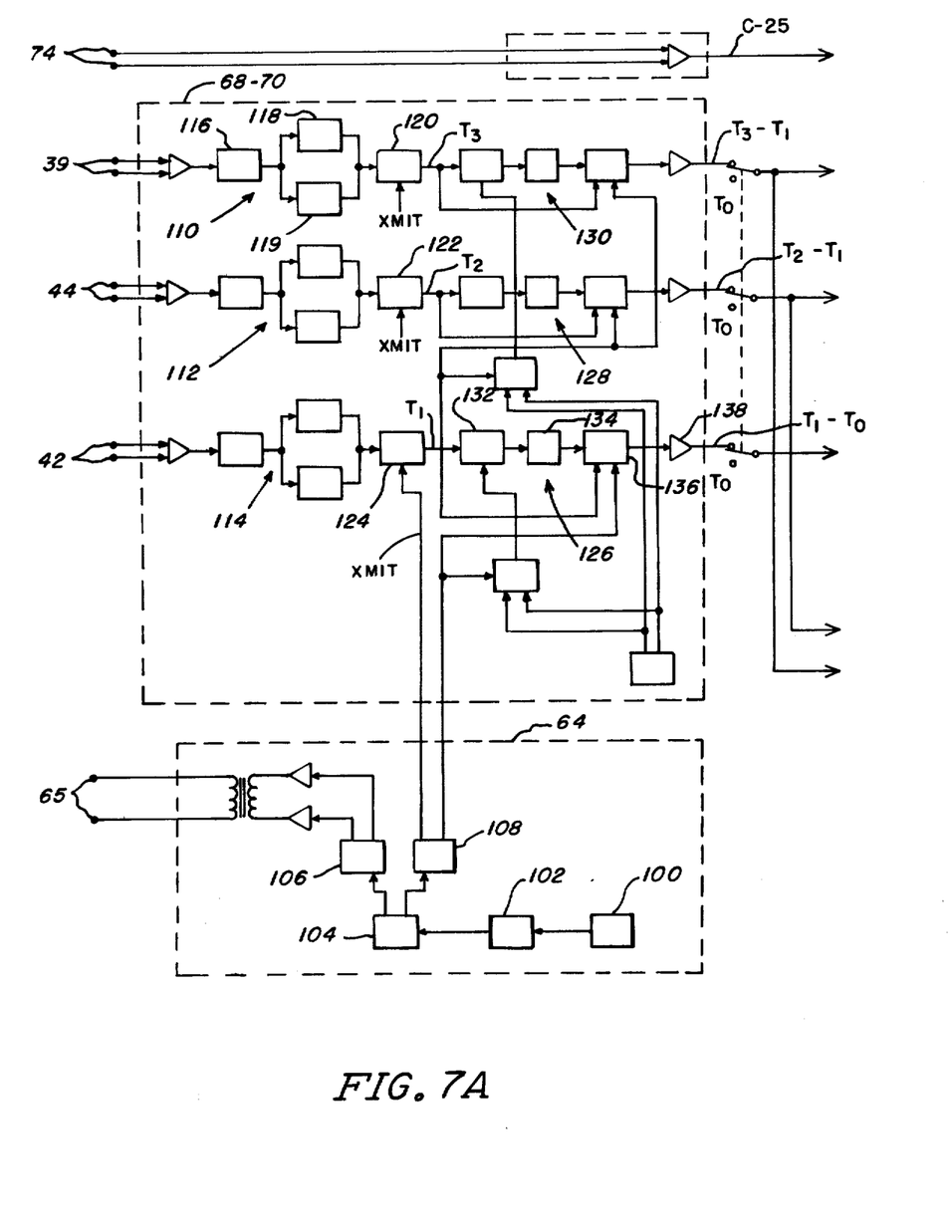
Figure 7B:
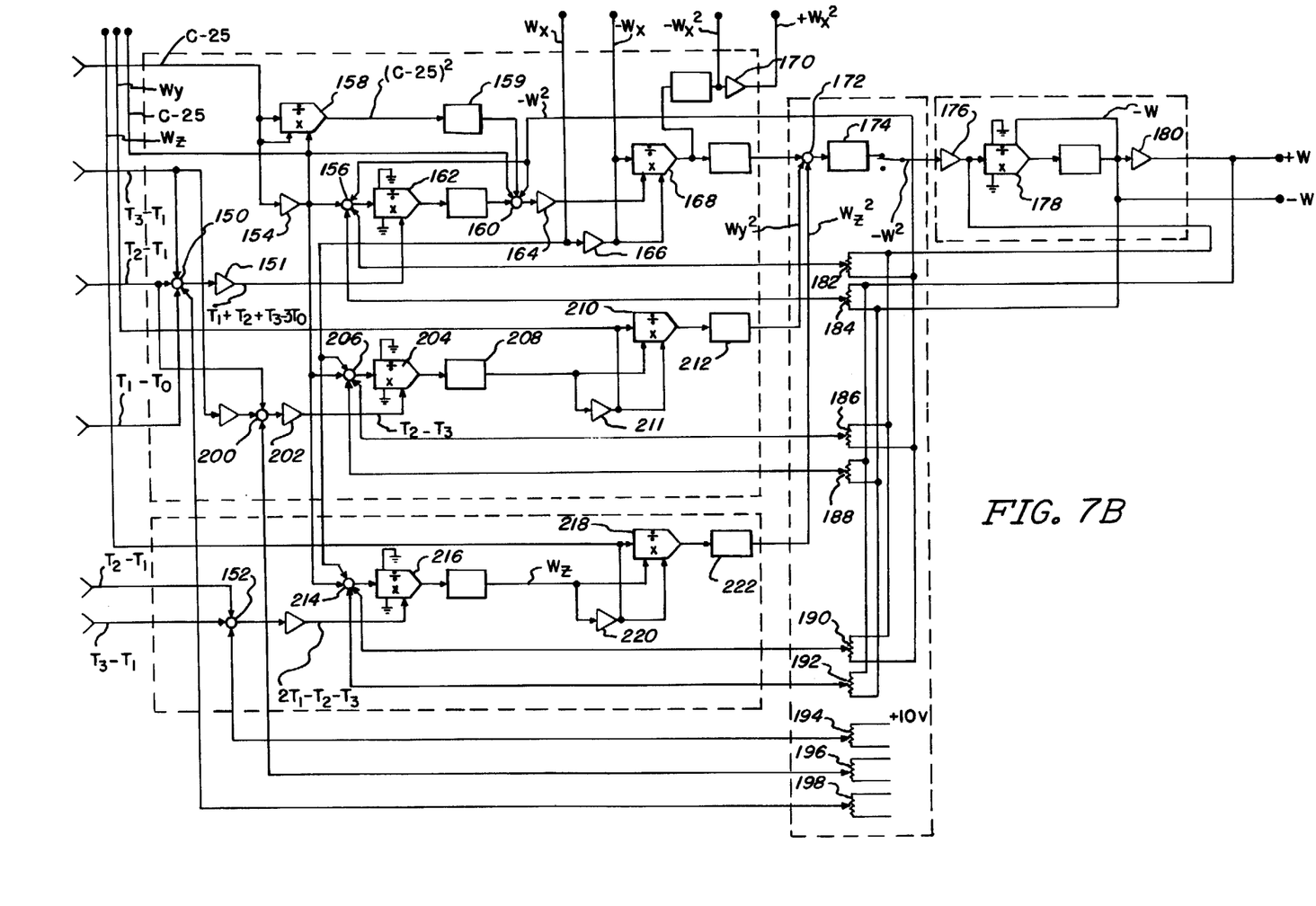

The circuitry for carrying out the computational functions associated with the present apparatus are shown in even greater detail in FIG. 7 (A and B). In FIG. 7A the clock and timing circuits 64 are shown to comprise a clock 100 whose output (selected to be a 2.4 mHz signal in a preferred embodiment) is fed into a divider circuit 102 which divides the output of the clock 100 by 16 so as to produce at the output thereof a 150 kHz signal. This signal is then fed into a further frequency divider 104 which divides the 150 kHz signal by 1500. The output of the divider 104 will be a 100 Hz signal which feeds a transmitter sequencer 106 whose output in turn provides a short 75 kHz pulse at a 100 Hz rate to the drive circuit 65 for the transmitter transducers.

The detection and time difference circuits 68-70 of FIG. 6 are shown in greater diagramatic detail in FIG. 7A with the inputs therefor being derived from receivers 39, 44 and 42, as well as from a logic decode circuit 108 associated with the clock and timing circuitry 64. The latter circuit 108 provides two signals, one representing the transmit pulse XMIT which is fed to the transmitter transducers and a timing signal $T_O$.

Each of the input signals from the receivers 39, 44 and 42 pass through a series of signal conditioning circuits 110, 112 and 114, each of which comprises a band pass amplifier such as indicated at 116, the output of which feeds a peak detector 118 and a zero crossover detector 119. These latter two circuits feed into a time set logic circuit 120, which has a further input from the logic decode circuit 108 and provides a signal matched to the transmit signal from the decode circuit 108. The output of the time set logic circuit 120 will be a signal representative of the time signal $T_3$.

A similar time set logic circuit 122 connected to the output of 112 provides a signal on its output representative of the timing signal $T_2$. A further time set logic circuit 124 is provided to receive the output from the circuitry 114 and the XMIT signal to produce a further time signal $T_1$.

Each of the time signals $T_1$, $T_2$, and $T_3$, pass through a switching logic circuit and limiting circuit 126, 128 and 130 respectively. Each of these circuits comprises similar circuitry such as a switching logic and averaging circuit 132 and limiting circuit 134 which, in turn, feeds into a hold logic circuit 136. The circuit 136 receives an input signal $T_0$ and the timing signal $T_1$ and produces on the output thereof at a transfer amplifier 138 a time difference signal identified as $T_1-T_0$.

Similar outputs are generated by the circuits 128 and 130 as represented by the time signal differentials $T_2-T_1$ and $T_3-T_1$ respectively.

The temperature signal C-25 is available in the circuit and is derived from the temperature sensing circuitry 74 discussed above.

The time differential signals, and the temperature signal, from the circuitry of FIG. 7A are coupled into the computational circuitry illustrated in greater diagramatical detail in FIG. 7B. In the computational circuitry, the time differential signals coming in from the circuitry of FIG. 7A are fed into a summing circuit 150 which will produce at its output amplifier 151 a timing signal in the form of $T_1+T_2+T_3-3T_0$. The timing signals are also fed to a further summing circuit 152 which produces on the output of its output amplifier a timing signal in the form $2T_1-T_2-T_3$.

The temperature signal C-25 is fed through an operational amplifier 154 whose output appears again as C-25 which is then applied to a further summing circuit 156. The temperature signal C-25 is fed into an analog calculation circuit 158 at two input points so that this circuit, with respect to the two connected inputs, will perform a mathematical multiplication resulting in the squaring of the temperature function. The squared temperature function is passed through a filter 159 to a further summing circuit 160. The summing circuit 160 receives as inputs the signals representing both the basic temperature signal and the squared form thereof as well as signals representing the negative square of the calculated airspeed and a signal derived from an analog computational circuit 162 having as an input the output of the summing circuit 156 and the output of the operational amplifier 151. The output of the computational circuit 162 and the summing circuit 160 will be an output signal fed to the output of operational amplifier 164 and will take the form of the X vector of the airspeed as represented by the signal $W_x$. The signal $W_x$ is passed through an inverter 166 and is available in inverted or negative form on the input of further analog computational circuit 168. This latter circuit has on its inputs the two $W_x$ signals and, consequently, the output signal takes the form of the square of the $W_x$ signal. This signal is fed through filtering circuits and is available, as indicated, on the input and output of an operational amplifier 170 in both negative and positive squared forms.

The squared function $W_x^2$ is also fed into a further summing circuit 172. Also fed into the input of the summing circuit 172 are the squared functions of $W_y$ and $W_z$ derived from circuits to be described below. The output of the summing circuit 172 passes through a filter 174 and will take the form of the squared function of the main component of the airspeed W. The signal $W^2$ is in turn fed through another inverter amplifier 176 into a further analog computational circuit 178, the output of which is a signal representative of the main component W in negative form. After passing through an operational inverter amplifier 180 the signal W appears in positive form. The squared function $W^2$ of the main airspeed component is applied to a calibration potentiometer 182, while the airspeed component W is applied to a calibration potentiometer 184. The outputs of these two calibration potentiometers are fed back to the summing circuit 156. Similar calibration potentiometers are shown at 186, 188, 190 and 192 and cooperate, on their outputs, with summing circuits on the inputs of the other two input channels as discussed below. Also associated with the calibration of the apparatus are three additional calibration potentiometers 194, 196 and 198, the outputs of which are connected to the summing circuits 150, 152 and 200 in the time differential input channels.

Associated with the time differential inputs is the further summing circuit 200 which, on the output of its output amplifier 202 carries a time differential signal in the form of $T_2-T_3$. This signal is fed into a further analog computational circuit 204 which has as a further input a summing circuit 206, the latter having as inputs the signals representative of the main airspeed signal W and its squared form $W^2$, as derived from the potentiometer calibration circuits 186 and 188. There is also a temperature input signal C-25 and a signal from the output of the amplifier 164. The output of the calculating circuit 204 will be $W_y$ and this signal then passes through a filter circuit 208 to a further analog computational circuit 210. The signal $W_y$ is inverted on the input of the calculating circuit 210 by the inverter amplifier 211. The circuit 210 is arranged so that the Y vector of the airspeed W appearing on the output of the filter 208 will be squared in the circuit 210 and will appear on the output as a squared function $W_y^2$ at the output of filter 212. A further summing circuit 214 has inputs comparable to those of the summing circuit 206 and the output of this summing circuit feeds into a further analog computational circuit 216 whose output is in the form of the Z vector of the airspeed W. This signal $W_z$ is fed to a further analog computational circuit 218 and, by reason of the inversion supplied by the amplifier 220, and the connections of the signals to the circuit 218, the squared function of the Z component of W is provided on the output of the filter circuit 222.

The circuitry shown in FIGS. 7A and 7B is used to implement the calculations required to determine the airspeed and its X, Y and Z components in accordance with the simplified equations discussed above. This circuitry minimizes the complexity of the computational apparatus needle while maintaining optimum accuracy.

In considering the operation of the overall system, it will be apparent that the ultrasonic transmitter transducers 28, 29 and 31, will produce ultrasonic waves which are transmitted toward their respective receiver units 39, 44 and 42. Depending upon the airspeed and its direction with respect to the probe 20, the difference in propagation time of the ultrasonic wave energy will result in there being a time difference which will be directly related to the effective ultrasonic wave path length between the transmitter and receiver as affected by air movement relative to the wave paths in the probe 20. These time difference signals are selectively combined, as required by the particular mathematical equations being utilized, in the circuitry 68–70 and fed into the computational circuits of FIG. 7B. These computational circuits will, in turn, produce the desired signals which will be representative of the speed of the air moving past the probe 20, as well as the X, Y and Z components making up that air movement as illustrated in FIG. 5. The resulting signals, which are analog signals, generated in the circuiting of FIG. 7B, may be utilized in any desired manner for driving indicators or for control purposes associated with the operation of the aircraft carrying the probe 20.

There has been illustrated and described a preferred embodiment of the invention. It will be obvious to those skilled in the art that modifications may be made within the spirit of the invention and, therefore, the scope of the invention should be considered in the light of the claims.

The invention is claimed as follows:

1. A gaseous movement sensing apparatus comprising:

an ultrasonic wave transmitting and receiving transducer means comprising a common support having along a central axis thereof a central support element with a conical outer surface, the vertex of which lies along said axis and defines the forward direction of said apparatus, said conical surface having three transmitting transducer elements mounted in the surface thereof and displaced relative to each other by approximately 120°, said three transmitting transducer elements each facing outwardly and in a forward direction relative to said central axis so that each of said transmitting transducer elements when mounted within said conical surface will be facing directly into the path of the gas whose movement is being sensed, three separate ultrasonic receiver transducer means each separately carried by said common support and spatially positioned about said central support element and each aligned with one each of said transmitting transducer elements along a line extending perpendicular from said conical surface, each of said receiver transducer means being flush mounted within the side of a separate elongated streamlined housing, carried by said common support, and each of said receiver transducer means when mounted facing toward its corresponding transmitting transducer element;

an ultrasonic wave energy source connected to said transmitting transducer elements to energize said elements to project ultrasonic wave energy in one direction only from each of said transmitter transducer elements toward each corresponding one of said receiver transducer means;

and means connected to said receiver transducer means to measure the time difference in the received signals received by said receiving transducer means and thereby the movement of a gaseous medium relative to said sensing apparatus.

* * * * *